A. TOMMASINI.
PROCESS OF HYDRO ELECTRIC SMELTING.
APPLICATION FILED AUG. 1, 1912.
1,050,255.
Patented Jan. 14, 1913.
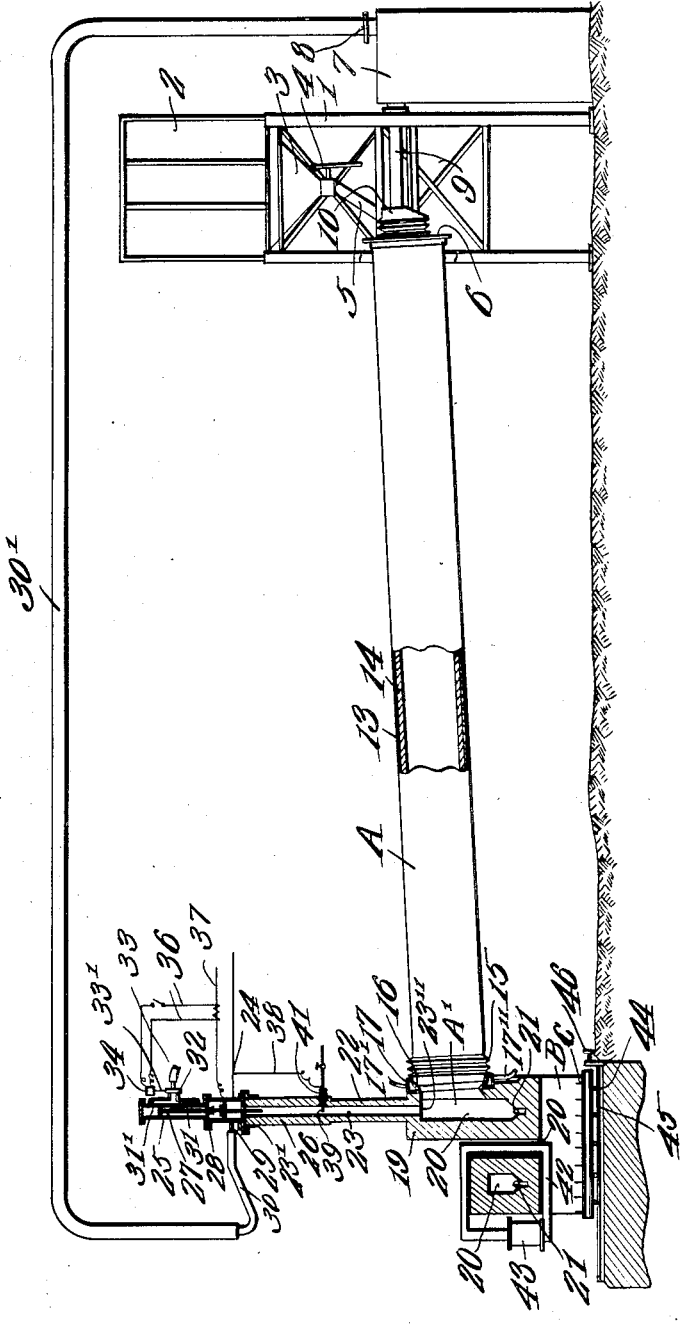
Witnesses
Antonio Tommasini,
Inventor
by C.A. Snow & Co.
Attorneys

UNITED STATES PATENT OFFICE.

ANTONIO TOMMASINI, OF NEW YORK, N. Y., ASSIGNOR OF ONE-HALF TO MARCELLUS E. THORNTON, OF HICKORY, NORTH CAROLINA.

PROCESS OF HYDRO-ELECTRIC SMELTING.

1,050,255.  Specification of Letters Patent.  Patented Jan. 14, 1913.

Application filed August 1, 1912. Serial No. 712,742.

*To all whom it may concern:*

Be it known that I, ANTONIO TOMMASINI, a citizen of the United States, residing at Brooklyn, New York city, in the county of Kings and State of New York, have invented a new and useful Process of Hydro-Electric Smelting, of which the following is a specification.

This invention relates to improvements in a process of hydro-electric smelting, the object of the invention being the provision of a process by means of which the hydrogen reduction process is operated, and consists in the passage of very highly heated hydrogen gas through a continually agitated mixture of iron or ore with proper fluxes, and then passing the gaseous products of the ensuing reaction through a jet or surface condenser, thereby condensing the vapor and retrieving the hydrogen gas which did not react.

In this process is employed a furnace in which the iron ore is intimately mixed with proper fluxes and is continuously agitated in the presence of highly heated hydrogen; the hydrogen gives up a portion of its heat to the ore mixture and thereby brings it up to temperature of reaction; the molten iron and slag resulting from reaction flow into a crucible or reheater in which the iron is kept hot by electric currents induced therein, and the gaseous products of the reaction, consisting chiefly of hydrogen and water, vapor and steam, are passed through a condenser thereby condensing the steam and vapor and conveying the hydrogen back to the holder. The hydrogen performs the double function of reducing agent and heat carrier to charge of ore and flux and surrounding container. This heat is imparted to the hydrogen in a specially devised furnace to be subsequently described. Therefore, this hydro-electric furnace is devised to employ electricity as the heating agent, and hydrogen as the reducing or chemical agent. This hydro-electric furnace consists essentially of a rotatable inclined tubular hearth communicating at its upper end with suitable bins containing ore and fluxes, and a condenser for retrieving hydrogen; and at its lower end communicating with a crucible or reheater for receiving the molten metal and slag from the hearth, and with an arc furnace for heating hydrogen before it reaches the hearth.

With the foregoing and other objects in view which will appear as the description proceeds, the invention resides in the combination and arrangement of parts and the details of construction hereinafter described and claimed, it being understood that changes in the precise embodiment of invention herein disclosed can be made within the scope of what is claimed, without departing from the spirit of the invention.

In the drawings, is illustrated a side elevation of a complete apparatus employed to carry this process into effect, portions of the apparatus being shown in section to clearly illustrate the interior construction thereof.

The apparatus superficially described in the present application is covered in detail in a co-pending application filed even date herewith, Serial No. 712,741.

The charge of ore and fluxing material in the bin 2, supported upon the frame work 1, passes through the hopper 3 into the chute 5, then through the casing 10 carrying as a tight joint, into the tubular hearth A. The hearth is composed of a metallic cylindrical shell 13 lined with refractory material 14, and is so mounted that it rotates about an inclined axis. By virtue of this rotation about an inclined axis the charge is moved and agitated toward the lower end of the hearth A. The hydrogen gas is heated in the arc furnace 22 to such a high temperature that when it reaches the charge in the hearth it gives up a portion of its heat to the charge and surrounding hearth and thus their temperature is raised to the temperature of reaction. In this reaction the hydrogen combines with the oxygen of the ore to form super-heated steam and thereby setting the iron free in the form of molten iron. The impurities of the ore combine with the fluxes to form molten slags. In this reaction a chemical equilibrium takes place before all the hydrogen has combined, so that much uncombined hydrogen will pass out of the hearth with the super-heated steam. To retrieve the hydrogen the gaseous products of the reaction pass from the hearth into a condenser 7 where the steam is condensed and the hydrogen passes back to the holder. The molten iron and slags pass from the hearth A through the gas tight joint 15—17 into the crucible or reheater 19 where the molten iron is kept hot by electric currents induced therein, as will be described. In the hearth the movement of the charge is so timed that the reaction takes place in the lower quarter of its length, and the reaction must be complete before reaching the lower end of hearth A. Under no circumstances, must any of the charge enter the reheater 19. The hydrogen is heated in a separate furnace 22 shown for convenience above the reheater, in which is caused to be established and maintained a long electric arc, around and coming in contact with which passes the hydrogen gas before admission to the hearth, thereby acquiring a very high temperature. The charge passes from the bin 2 through the hopper 3, through the gate or valve 4, and through the chute 5 which passes through the casing 10 into upper end of the hearth A.

In the drawings is shown in detail sectional view the hydrogen heating furnace 22 and the crucible or reheater 19.

The heating furnace 22 composed of a tubular chamber having a fixed electrode 41 in the insulating bushing 39, this electrode being situated at the discharge end of the chamber; and a movable electrode 26 carried by the piston 27 of a pneumatic or hydraulic engine 25 situated at the inlet end of the chamber. The inlet end of the chamber 22 is capped or surmounted by a casing 24 which carries a cylinder 25. A piston 27 in the cylinder 25 actuates the rod 26 which passes through suitable stuffing boxes in the chamber 23'. The movable electrode 26 is carried by this piston rod. The detailed structure herein set forth is fully described in the copending application above referred to, Serial No. 712,741. The rubber tube 30 and pipe 29 serve to conduct the hydrogen to the chamber 23 where it comes in contact with the arc and then passes through chamber 23 to the lower end of hearth A. The valve 32 controls the admission of pressure to and release of pressure from either side of the piston 27, and said valve 32 is operably connected to the electro-magnet 34 which is controlled directly or indirectly by the current flowing through the main circuit 37—38.

When the circuit in 37—38 is broken, the electro-magnet 34 releases the valve 32 which moves so as to admit pressure to the cylinder and to cause the piston 27 to move the rod 26 toward the fixed electrode 24 and thereby establish a contact between the electrodes. When the circuit 37—38 is closed, the electric current is established therein, and this current directly or indirectly excites the electro-magnet 34 to move the valve 32 so as to admit pressure to the other side of the piston 27 and thereby cause said piston 27 to carry electrode on end of the rod 26 away from fixed electrode 41 thereby establishing the arc. Should the arc break for any reason, the above described cycle of operation will automatically ensue and thereby reestablish the arc.

The crucible or reheater 19 serves to receive the molten metal and slag resulting from the reaction and also to maintain by electrical means the temperature of the molten metal at any desired temperature, as will be explained. The crucible or reheater 19 consists of an annular compartment 20 communicating with the hearth A and the furnace 22. Interlinked with this compartment 20 is the laminated iron ring 42 which in turn is linked with the coil or solenoid 43. The bottom of the annular compartment 20 consists of a V-shaped annular trough 21 for reasons which will presently appear. When the molten metal passes from the hearth A into the crucible 19 it falls into the V-shaped annular trough 21 of compartment 20, and flowing around will form a ring of molten metal. This ring of molten metal will link with the iron ring 42 and thereby be inductively related to the exciting or primary coil 43. When an alternating current of electricity flows in coil 43 it causes to be established a periodic magnetic flux in the ring 42; which periodic flux will induce electric currents in the molten metal ring lying at the bottom of 21 and linking with the magnetized ring 42. These induced currents cause heat to be generated within the mass of the molten ring; and by varying the intensity of these induced currents by means of variation of the current flowing in the coil 43 any desired temperature can be maintained in the molten metal. It is important that these secondary or induced currents in the molten metal be made to take place as soon as possible after the molten metal leaves the hearth A; and to bring this about it is important that the molten metal flows around and forms a closed ring in the trough 21 as soon as possible after having entered the reheater 19. The V-shaped trough 21 of the compartment 20 allows a ring of molten metal to form with a very small cross section, and consequently with only a small quantity of metal; and the V-shaped trough by allowing the molten metal to form a closed ring with only a small quantity of metal, will thereby allow this ring to form as early as possible after the molten metal starts to enter the reheater; and as the induced electric currents are established immediately upon the formation of this closed ring, and as it is plain that the V-shaped trough 21 expedites the formation of this molten metal ring, it follows that the V-shaped trough 21 is the means of allowing heat to be supplied to the molten metal at as early as possible a moment after the molten metal enters the crucible or reheater 19,—this heat being supplied as above described by electrical means.

The joints between rotating and fixed members of this furnace are gas tight, and this condition is obtained by means of the elastic cylinder 15 which turns with the hearth A and the hollow metallic frame 16 which is built into and forms opening to the crucible 19. The elastic cylinder is composed of a series of metallic rings which are frustums of very flat cones and riveted together as shown. One end of this elastic cylinder is attached to the shell of the hearth and the other end terminates in a ring with a planed face. This ring butts against and slides upon a corresponding planed face on the hollow frame 16. Any relative displacement between rotating and fixed members of this furnace due to changes of temperature or other causes is compensated by corresponding changes in the length of the elastic cylinder 15 and thereby any separation between rotating and fixed members is prevented and permanency of gas tight joint accomplished.

The crucible or reheater 19 is mounted upon a frame C by means of the arch B. The frame C is carried by rollers 44 which rest upon the rails 45. The rails 45 are slightly inclined to insure a tendency on the part of the reheater to move toward the hearth. The jack screws 40 serve to move the reheater away from hearth to allow of inspection and repairs in hearth and reheater.

No form of rotating means for rotating the tubular hearth A has been shown, such construction being well known and the means for rotating the same being a necessary adjunct.

In employing the term super-heated hydrogen throughout the present specification, the prefix "super" serves to indicate that the hydrogen is heated far above the melting point of the metal charge, such melting point of the charge being the datum or bench mark to which the word "super" refers. As the hydrogen gas is the agent employed as a carrier as well as a reducing or chemical agent, it is necessary that the temperature of the same be greatly above the melting point of the charge to be affected, this excess being given up to the charge, thereby raising the temperature of the charge to that necessary for reaction. As for example, assuming that iron melts at 2700° Fahr., the charge entering the hearth would be at the temperature of air or approximately 60° Fahr. Thus this charge must be heated to 2700° Fahr., and in order to accomplish this with the heated hydrogen gas, the temperature of such gas should be raised to approximately 6500° Fahr., so that when it comes in contact with the charge at 60° Fahr., the charge will be affected by the super heated hydrogen gas and raised to the melting temperature of 2700° Fahr., while at the same time the hydrogen by reason of having given up this heat to the charge, will be lowered to approximately 2700° F.

What is claimed is:—

1. The herein described process of smelting ore, consisting in subjecting the lower end of a descending column of ore and also the full column thereof throughout its length within a hearth to a heated current of reducing gas passing through the hearth in an opposite direction to the ore, condensing the moisture taken from the ore and carried by the reducing gas after passage through the hearth, retrieving the reducing gas that has failed to react during the passage through the hearth, and returning the reducing gas for subsequent cycles.

2. The herein described process of smelting ore, consisting in subjecting the lower end of a descending column of ore and also the full column thereof throughout its length, within a hearth, to a heated current of hydrogen passing through the hearth in an opposite direction to the ore, condensing the moisture removed from the ore from the hydrogen gas after its passage through the hearth, retrieving the hydrogen that has failed to react, and returning it for subsequent cycles.

3. The herein described process of ore reduction, consisting in subjecting a moving column of ore entering a hearth at atmospheric temperature to a current of hydrogen gas passed through and heated by an electric arc before its contact with the ore column, said hydrogen gas being heated to a temperature in excess of the melting temperature of the metal of the ore, condensing the moisture removed from the ore by the heated hydrogen gas and after passage from the hearth, retrieving the hydrogen gas that has failed to react after entering the ore column, and returning the hydrogen gas to the electric arc.

4. The herein described process of ore reduction, consisting in subjecting a moving column of ore entering a hearth at atmospheric temperature to a current of hydrogen gas passed through and heated by an electric arc before its contact with the ore column, said hydrogen gas being heated to a temperature in excess of the melting temperature of the metal of the ore, retrieving the hydrogen gas that has failed to react after entering the ore column, returning the hydrogen gas to the electric arc, and condensing the moisture extracted from the ore and carried by the hydrogen gas at the exit of the hydrogen gas from the ore column and before subjection thereof to the electric arc.

In testimony that I claim the foregoing as my own, I have hereto affixed my signature in the presence of two witnesses.

ANTONIO TOMMASINI.

Witnesses:
S. McLaren,
Ernest Armstrong.